United States Patent
Miller et al.

(10) Patent No.: US 9,457,443 B2
(45) Date of Patent: Oct. 4, 2016

(54) MACHINE LOCATING PIN

(71) Applicant: Toyota Motor Engineering & Manufacturing North America, Inc., Erlanger, KY (US)

(72) Inventors: Michael W. Miller, Georgetown, KY (US); Thomas J. Butrum, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 143 days.

(21) Appl. No.: 14/185,340

(22) Filed: Feb. 20, 2014

(65) Prior Publication Data
US 2015/0231749 A1   Aug. 20, 2015

(51) Int. Cl.
| | |
|---|---|
| *B23Q 3/10* | (2006.01) |
| *B60J 1/02* | (2006.01) |
| *B23Q 7/00* | (2006.01) |
| *B23Q 3/18* | (2006.01) |
| *B23C 9/00* | (2006.01) |
| *B23Q 16/00* | (2006.01) |

(52) U.S. Cl.
CPC . *B23Q 3/18* (2013.01); *B23C 9/00* (2013.01); *B23C 2215/08* (2013.01); *B23Q 16/001* (2013.01); *Y10T 29/49998* (2015.01); *Y10T 29/53913* (2015.01); *Y10T 409/30868* (2015.01)

(58) Field of Classification Search
CPC ...... B23Q 16/001; B23Q 3/18; B23Q 17/00; B23P 21/008; B25B 17/00; B25B 15/00; B25B 21/00; Y10T 29/49998; Y10T 29/53913
USPC ......... 269/53, 54, 54.4, 54.5, 50, 51, 52, 47; 409/900.1
See application file for complete search history.

(56) References Cited

U.S. PATENT DOCUMENTS

| | | | | |
|---|---|---|---|---|
| 2,813,385 | A * | 11/1957 | Mouer ................. | B24B 5/421 451/397 |
| 2,955,820 | A * | 10/1960 | Berg .................... | B25B 11/00 269/145 |
| 3,319,325 | A * | 5/1967 | Nessamar ............ | B25B 27/0028 29/235 |
| 3,565,416 | A * | 2/1971 | Williamson ......... | B23Q 1/0063 269/311 |
| 3,770,261 | A * | 11/1973 | Anderson ............. | B25B 5/106 269/47 |
| 4,793,603 | A * | 12/1988 | Wober .................. | B23Q 3/002 269/241 |
| 5,722,648 | A * | 3/1998 | Groll ................... | B23Q 16/001 269/47 |
| 5,881,960 | A * | 3/1999 | Christie ............ | G11B 23/08778 242/342 |
| 6,116,935 | A | 9/2000 | Fukuda | |
| 6,573,522 | B2 * | 6/2003 | Elliott ............... | H01L 21/67259 250/559.12 |
| 6,609,594 | B1 | 8/2003 | Charmat et al. | |
| 6,634,266 | B2 | 10/2003 | Brinker et al. | |
| 7,086,643 | B2 * | 8/2006 | Teague ................. | B25B 5/006 269/305 |
| 7,175,024 | B2 * | 2/2007 | Fankhauser ....... | H01L 21/67346 206/486 |
| 7,182,328 | B2 * | 2/2007 | Teague ................. | B25B 5/006 269/305 |
| 7,475,466 | B2 * | 1/2009 | Marume ............. | B25B 27/0035 29/281.5 |
| 7,577,229 | B2 * | 8/2009 | Chambrin ............ | G21C 3/3305 376/364 |

(Continued)

FOREIGN PATENT DOCUMENTS

| | | | |
|---|---|---|---|
| CN | 201405247 Y | * | 2/2010 |
| JP | 06170674 A | * | 6/1994 |

*Primary Examiner* — Essama Omgba
(74) *Attorney, Agent, or Firm* — Christopher G. Darrow; Darrow Mustafa PC

(57) ABSTRACT

A locator pin according to one disclosed non-limiting embodiment of the present disclosure includes an elongated body that extends from a base along an axis, the elongated body deflectable off the axis relative to the base.

20 Claims, 4 Drawing Sheets

(56) References Cited

U.S. PATENT DOCUMENTS

| | | |
|---|---|---|
| 7,963,511 B2 | 6/2011 | Meda |
| 7,976,094 B2 * | 7/2011 | Lesle .................. B60J 1/005 296/96.21 |
| 2004/0211700 A1 * | 10/2004 | Fankhauser ....... H01L 21/67346 206/701 |
| 2005/0073081 A1 * | 4/2005 | Teague .................. B25B 5/006 269/305 |
| 2007/0189433 A1 * | 8/2007 | Chambrin ............ G21C 3/3305 376/248 |
| 2009/0120922 A1 * | 5/2009 | Schutte ................ B23K 11/36 219/158 |
| 2010/0320806 A1 * | 12/2010 | Senge .................... F16B 19/02 296/201 |

\* cited by examiner

MACHINE LOCATING PIN

BACKGROUND

The present disclosure relates to apparatus useful in locating and manufacturing components, and more particularly to locating pins.

A variety of equipment is useful in locating and manufacturing components. Such components often need to be located in a particular position and orientation for further manufacturing or assembly processes. Previous machines utilize a spring operated pivoting clamp with a ramp surface to generally pinch a workpiece such as a knuckle to the machine until a fixture clamp grips the knuckle in a secure position to support machining operations. Although effective, the spring pivoting clamp may permit some knuckle slippage before the knuckle is securely clamped into position.

SUMMARY

A locator pin according to one disclosed non-limiting embodiment of the present disclosure includes an elongated body that extends from a base along an axis, the elongated body deflectable off the axis relative to the base.

A milling machine, according to another disclosed non-limiting embodiment of the present disclosure, includes a locator pin with an elongated body that extends from a base along an axis, the elongated body deflectable off the axis relative to the base, the elongated body receivable through an aperture in a workpiece; and a mechanical clamp operable to clamp the workpiece.

A method of preparing a workpiece to be machined according to another disclosed non-limiting embodiment of the present disclosure includes positioning the workpiece such that the locator pin is received by an aperture defined in said workpiece, wherein the locator pin comprises a base and an elongated body deflectable off a longitudinal axis; and clamping a portion of the workpiece.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
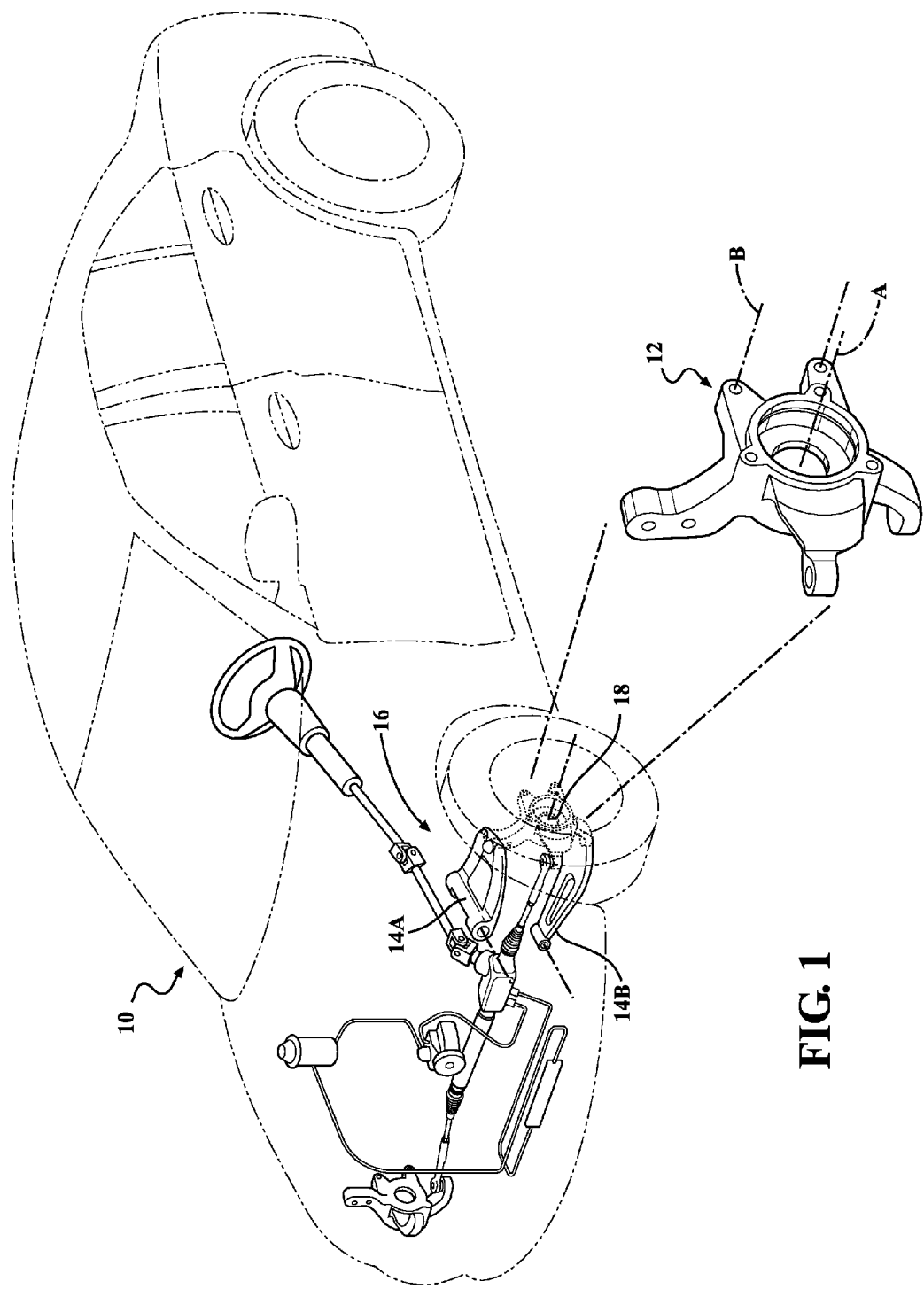
FIG. 1 is a schematic view of a vehicle with a suspension knuckle.
Figure 2:
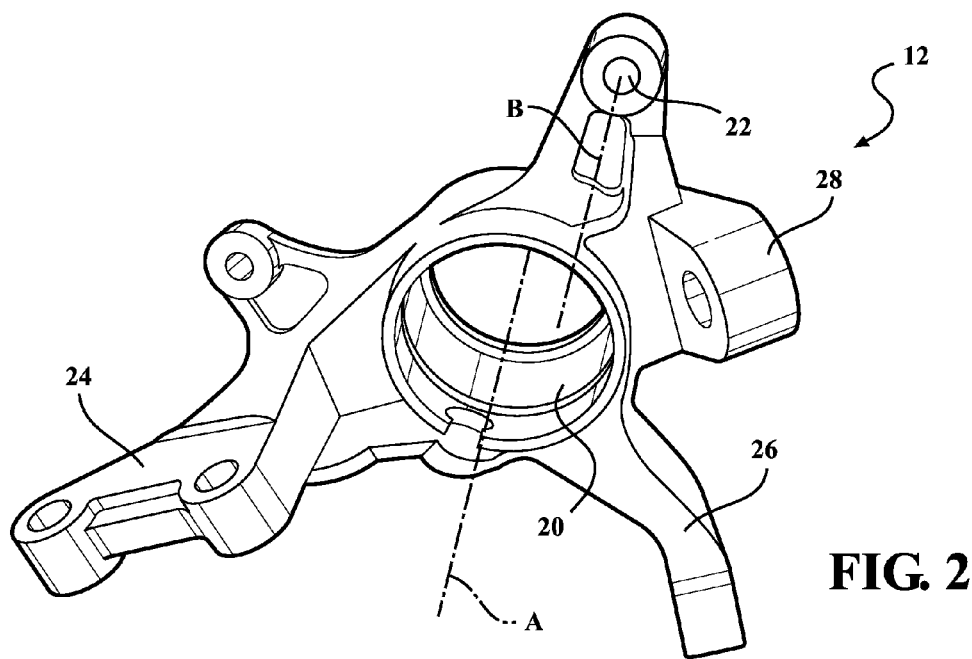
FIG. 2 is a schematic view of an example suspension knuckle.

FIG. 1 schematically illustrates selected portions of a vehicle 10 with a suspension knuckle 12 (FIG. 2). Generally, the knuckle 12 attaches upper and lower suspension components 14A, 14B to a wheel support assembly 16 to provide a mount point for a wheel hub 18. The knuckle 12 may be referred to as a "steering knuckle" if used in a location that requires the wheel hub 18 to turn, where the knuckle 12 rotates relative to the upper and lower suspension components 14A, 14B. The knuckle 12, as used herein, is the component behind a wheel that supports a wheel hub and attaches to other suspension components.

With reference to FIG. 2, the knuckle 12 generally includes a hub aperture 20 along a hub axis A. At least one mount aperture 22 along an axis B such as a brake caliper mount hole is displaced from the hub aperture 20. Hub axis A is parallel to axis B. The knuckle 12 includes at least one arm 24 such as a steering arm that extends generally transverse to hub axis A. Other arms 26 and attachment points 28 for particular knuckle configurations may also be provided. It should be appreciated that although a particular knuckle 12 is illustrated as the example workpiece, other components will also benefit herefrom.

Figure 3:
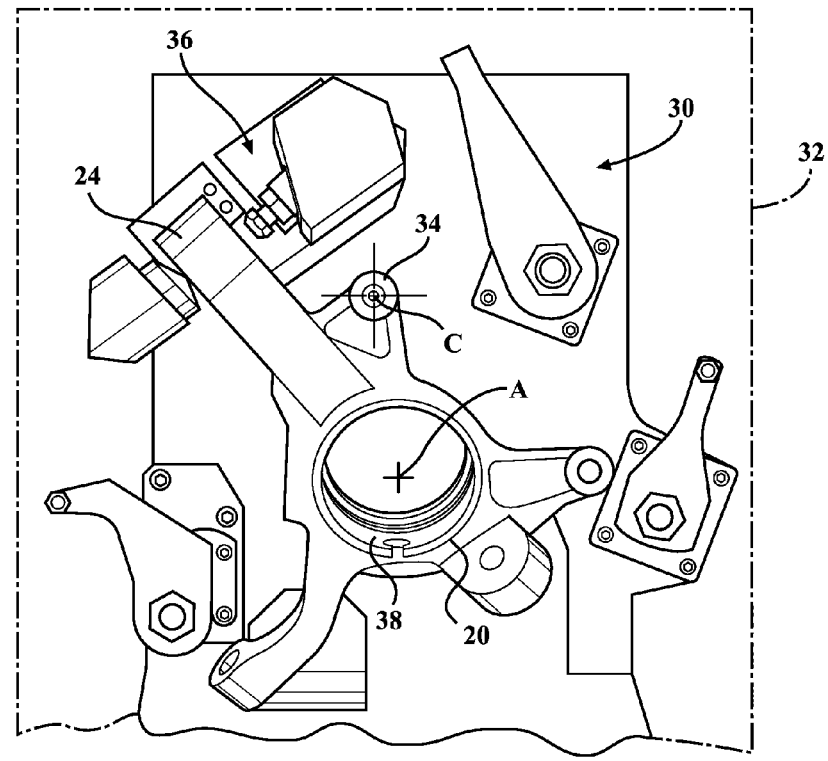
FIG. 3 is a schematic perspective view of a pallet with clamp and with a locator pin according to one disclosed non-limiting embodiment.

FIG. 3 schematically illustrates selected portions of a pallet 30 useful in the machining of a component such as the knuckle 12. The pallet 30, for example, is utilizable with or a portion of a horizontal milling machine 32 such as a TOYODA FH45-2 set-up with a pallet 30 specific to machining of the hub aperture 20 (FIG. 2). While locating pins can be described with respect to one embodiment useable in the horizontal milling machine fixture or pallet it is contemplated that locating pins described herein can be used in a variety of applications. Various equipment useful in the manufacture of vehicle driveline components such as knuckles are often at least partially manufactured on such horizontal milling machines. The knuckle is retained to the horizontal milling machine in a generally vertical plane.

The pallet 30 generally includes a locator pin 34 and a mechanical clamp 36. It should be appreciated that the pallet 30 may have more, less, or different components than those schematically illustrated. The locator pin 34 extends from the pallet 30 to facilitate, with gravity assist, that the knuckle 12 is properly positioned for receipt of the mechanical clamp 36.

Figure 4:
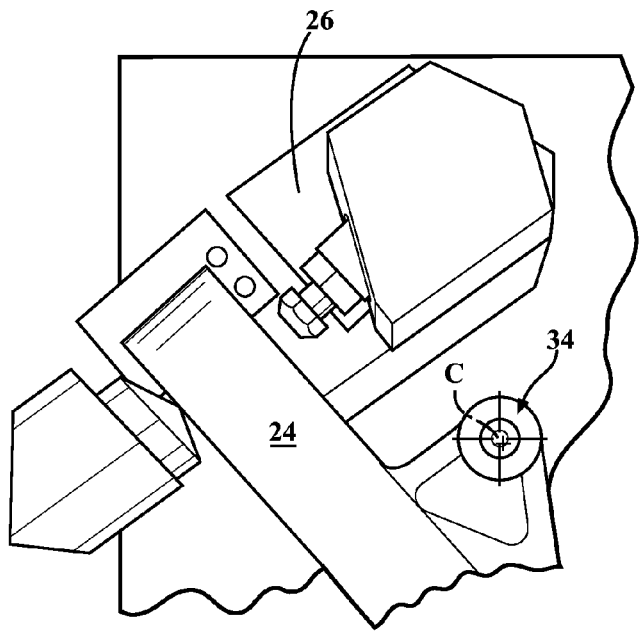
FIG. 4 is an expanded perspective view of the locator pin mounted to the pallet of a horizontal milling machine to support the example suspension knuckle.

The locater pin 34 provides flexibility to accommodate, then correct, potential misalignment of knuckle 12 when loaded into the pallet 30 until clamping by the mechanical clamp 36 is complete. The locator pin 34 is aligned along a horizontal axis C (FIG. 4) adjacent to a through-hole 38 of the pallet 30 to locate the knuckle 12 in a vertical plane so as to provide machine tool access through the hub aperture 20.

Figure 5:
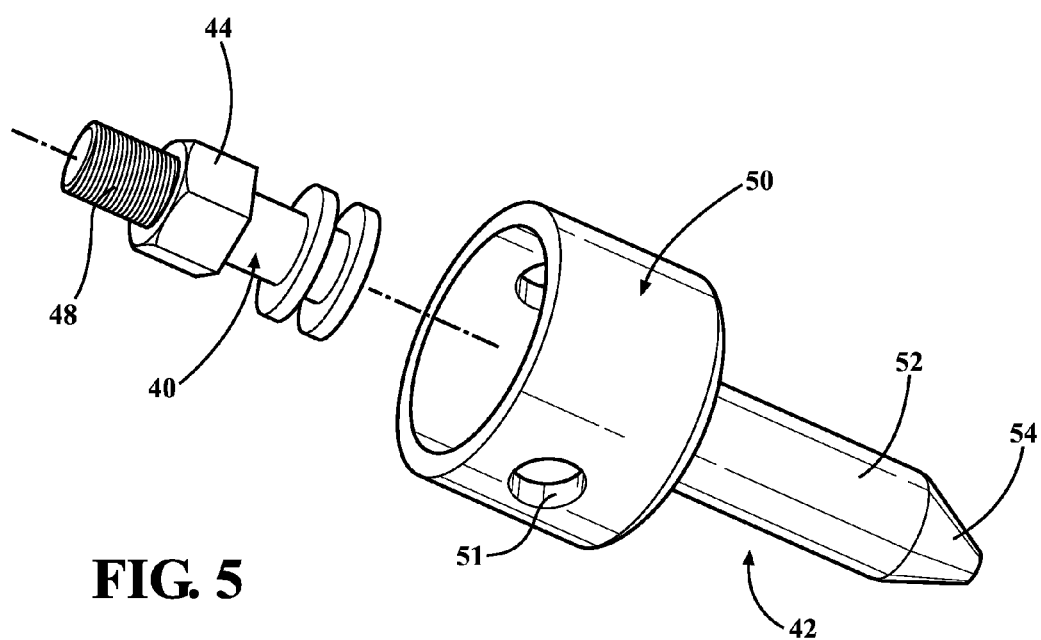
FIG. 5 is an exploded perspective view of the locator pin.
Figure 6:
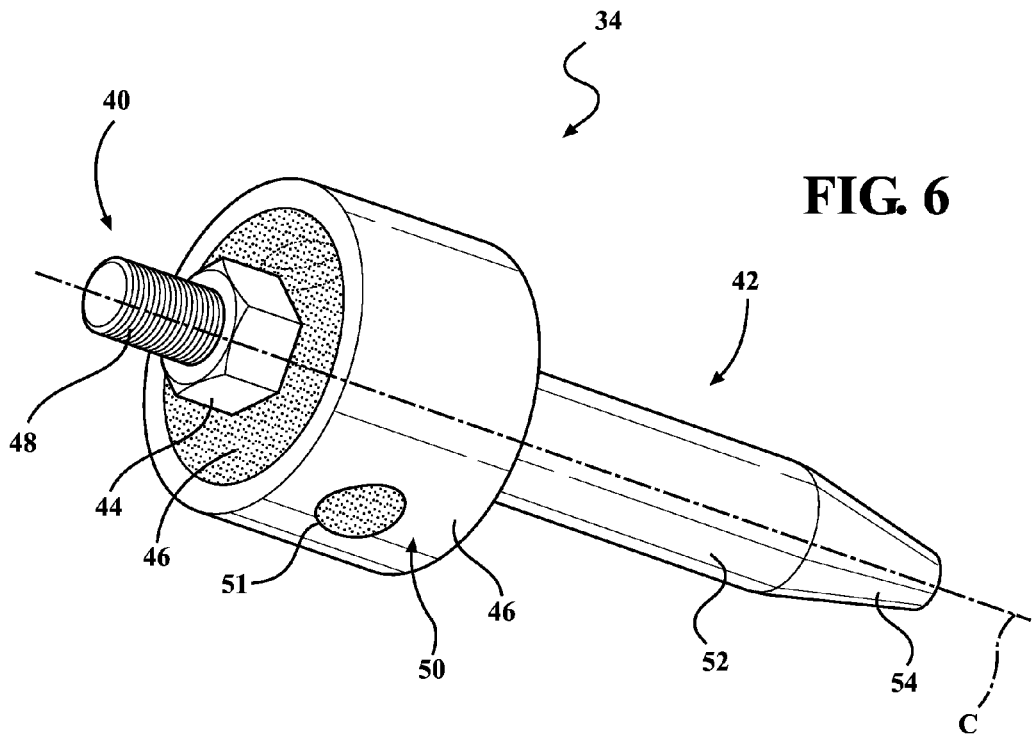
FIG. 6 is a schematic perspective view of the locator pin.
Figure 7:
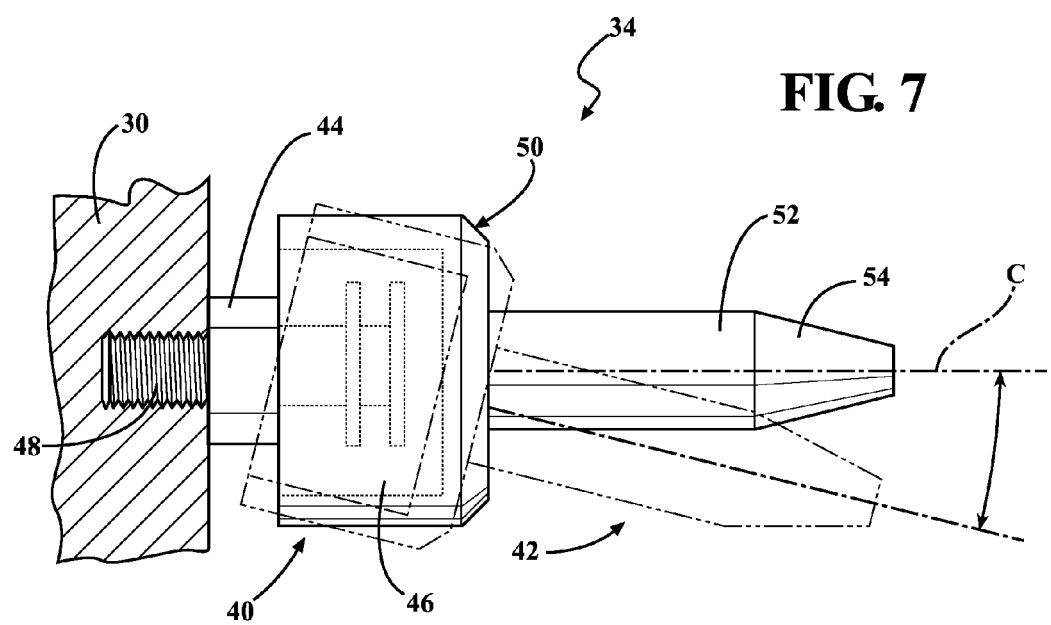
FIG. 7 is a side view of the locator pin in a deflected position.

With reference to FIGS. 5-7, the locator pin 34 generally includes a base 40 and an elongated body 42 that extends from the base 40 with a resilient member 46 therebetween. The base 40 interfaces with the pallet 30 and generally includes a nut 44, the resilient member 46 and a threaded attachment 48. In this disclosed non-limiting embodiment, the threaded attachment 48 threads into the pallet 30 and is locked into place by the nut 44, however, other attachments will also benefit herefrom.

The resilient member 46 may be manufactured of, for example, a ninety (90) durometer rubber cylinder bonded or molded between the elongated body 42 and the threaded attachment 48 (FIG. 6). That is, the resilient member 46 is molded between the base 40 and the elongated body 42 to permit deflection of the elongated body 42 with respect to the threaded attachment 48 that is mounted to the pallet 30. It should be appreciated that various configurations of the resilient member 46 such as a spoke and wheel arrangement may alternatively or additionally be utilized.

In one disclosed non-limiting embodiment, the elongated body 42 includes a cup 50 and a generally cylindrical portion 52 with a frustro-conical distal end 54. The resilient member 46 is molded within the cup 50 such that the elongated body 42 is deflectable off axis C relative to the threaded attachment 48. The cup 50 may include apertures 51 to further facilitate securing of the resilient member 46 therein such that the cup 50 or other housing that facilitates the formation of leverage between the base 40 and the elongated body 42 by the resilient member 46. That is, the cup 50 provides an additional reaction surface that reacts upon the outer radial surface of the resilient member 46 to bias the elongated body 42 toward the axis C. It should be appreciated that various alternative attachments may also benefit herefrom.

The cylindrical portion 52 is of a diameter to closely fit within the mount aperture 22 and the frustro-conical distal end 54 facilitates entrance therein. As the knuckle 12 is loaded onto the pallet 30 and the frustro-conical distal end 54 enters into the mount aperture 22, the elongated body 42 may readily deflect off axis C to accommodate and correct misalignment of the knuckle 12 with respect to the pallet 30. That is, the cylindrical portion 52 provides a flexible guide to receive the knuckle 12 such that the knuckle 12 is properly positioned.

With reference to FIG. 7, the resilient member 46 of the locating pin 34 can deform to permit the elongated body 42 to move off axis C. The resilient member 46 can also contract and/or stretch in directions generally parallel to axis C to facilitate location of the knuckle 12 generally in a vertical plane until the mechanical clamp 36 engages with, for example, the arm 24.

The locator pin 34 thereby facilitates manufacture and eliminates the use of a relatively complicated pivoting clamp to improve indexing of the knuckle 12 so as to properly position and support the vertical placement of the knuckle 12 prior to the mechanical clamp 36 securing the knuckle 12 for machining operations.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A locator pin, comprising:
   a base;
   an elongated body that extends from the base along an axis, the elongated body including a generally cylindrical portion attached to a cup, the cup opening along the axis towards the base, and positioned over the base, with a space between the base and an inside of the cup, and the generally cylindrical portion extending from the cup along the axis away from the base; and
   a resilient member secured between the base and the elongated body in the space between the base and the inside of the cup of the elongated body, with an outer radial surface thereof in contact against a reaction surface at the inside of the cup of the elongated body, the resilient member deformable when the outer radial surface thereof is reacted upon by the reaction surface at the inside of the cup of the elongated body to permit deflection of the generally cylindrical portion of the elongated body together with its cup off the axis relative to the base.

2. The locator pin as recited in claim 1, wherein the base is configured to mount to a horizontal milling machine.

3. The locator pin as recited in claim 2, wherein the base includes a threaded attachment adapted to receive a nut to mount the locator pin to the horizontal milling machine.

4. The locator pin as recited in claim 3, wherein the nut applies an axial tension onto the base to resiliently support the elongated body along the axis.

5. The locator pin as recited in claim 1, wherein the resilient member is manufactured of a ninety (90) durometer rubber.

6. The locator pin as recited in claim 1, wherein the cup includes at least one aperture, the resilient member occupying the aperture to at least partially secure the resilient member to the cup.

7. The locator pin as recited in claim 1, wherein the generally cylindrical portion has a frustro-conical distal end.

8. The locator pin as recited in claim 1, wherein the resilient member is molded into the space between the base and the inside of the cup of the elongated body.

9. A milling machine, comprising:
   a locator pin including:
   a base,
   an elongated body that extends from the base along an axis, the elongated body including a generally cylindrical portion attached to a cup, the cup opening along the axis towards the base, and positioned over the base, with a space between the base and an inside of the cup, and the generally cylindrical portion extending from the cup along the axis away from the base, and receivable through an aperture defined in a workpiece, and a resilient member secured between the base and the elongated body in the space between the base and the inside of the cup of the elongated body, with an outer radial surface thereof in contact against a reaction surface at the inside of the cup of the elongated body, the resilient member deformable when the outer radial surface thereof is reacted upon by the reaction surface at the inside of the cup of the elongated body to permit deflection of the generally cylindrical portion of the elongated body together with its cup off the axis relative to the base; and a mechanical clamp operable to clamp the workpiece.

10. The machine as recited in claim 9, wherein the workpiece is a knuckle.

11. The machine as recited in claim 9, wherein the axis is offset and parallel to an axis of a through hole in the milling machine.

12. The machine as recited in claim 11, wherein the through hole is defined along an axis aligned with a hub aperture through the workpiece.

13. The machine as recited in claim 9, wherein the resilient member is manufactured of a ninety (90) durometer rubber.

14. The machine as recited in claim 9, wherein the cup includes at least one aperture, the resilient member occupying the aperture to at least partially secure the resilient member to the cup.

15. The machine as recited in claim 9, wherein the generally cylindrical portion has a frustro-conical distal end.

16. The machine as recited in claim 9, wherein the resilient member is molded into the space between the base and the inside of the cup of the elongated body.

17. A method of preparing a workpiece to be machined, the method comprising:

positioning the workpiece such that a locator pin is received by an aperture defined in the workpiece, wherein the locator pin comprises:
a base,
an elongated body that extends from the base along an axis, the elongated body including a generally cylindrical portion attached to a cup, the cup opening along the axis towards the base, and positioned over the base, with a space between the base and an inside of the cup, and the generally cylindrical portion extending from the cup along the axis away from the base, and receivable through the aperture defined in the workpiece, and
a resilient member between the base and the elongated body in the space between the base and the inside of the cup of the elongated body, the resilient member deformable when reacted upon by the cup of the elongated body to permit deflection of the generally cylindrical portion of the elongated body together with its cup off the axis relative to the base;

deflecting the generally cylindrical portion of the elongated body together with its cup off the axis relative to the base to accommodate then correct potential misalignment of the workpiece; and clamping a portion of the workpiece.

18. The method as recited in claim 17, wherein the workpiece is a suspension knuckle, and the aperture is a brake caliper mount hole.

19. The method as recited in claim 17, further comprising:
facilitating, with gravity assist relative to the locator pin, that the workpiece is properly positioned by the locator pin for clamping.

20. The method as recited in claim 17, further comprising:
receiving and holding the workpiece generally in a vertical plane until clamping is complete.

* * * * *